United States Patent

[11] 3,598,281

| [72] | Inventor | Michael J. Watermeier<br>Memphis, Tenn. |
|---|---|---|
| [21] | Appl. No. | 859,037 |
| [22] | Filed | Sept. 18, 1969 |
| [45] | Patented | Aug. 10, 1971 |
| [73] | Assignee | Richards Manufacturing Company, Inc.<br>Memphis, Tenn. |

[54] PORTABLE LOADING MECHANISM FOR HEMOSTASIS CLIPS
4 Claims, 13 Drawing Figs.

[52] U.S. Cl. .................................................. 221/198,
221/232, 221/239
[51] Int. Cl. ...................................................... B65h 5/00
[50] Field of Search ............................................ 221/197,
198, 232, 239, 255, 257, 279

[56] References Cited
UNITED STATES PATENTS

| 2,250,303 | 7/1941 | Katz | 221/232 X |
| 2,483,379 | 9/1949 | Brell | 221/232 (UX) |
| 2,939,619 | 6/1960 | Levesque | 221/239 (UX) |
| 3,170,596 | 2/1965 | Nyberg | 221/232 X |
| 3,244,317 | 4/1966 | Raybin | 221/232 X |

FOREIGN PATENTS

| 1,017,392 | 10/1957 | Germany | 221/232 |

Primary Examiner—Robert B. Reeves
Assistant Examiner—David A. Scherbel
Attorney—John R. Walker, III ABSTRACT: A portable loading mechanism for use by nurses, doctors, or others, to load applicator forceps with hemostasis clips to be used in tying off blood vessels during surgery. The loading mechanism includes a base adapted to be held in the hand and a clip-receiving head mounted on top of the handgrip base. In the interior of the base is a magazine mechanism which delivers the clips one at a time to a preloading position in the head from where they are pushed by a finger-operated plunger mechanism to the bell-shaped mouth of the head for delivery to the end of the applicator forceps which are placed in the delivery mouth.

INVENTOR.
MICHAEL J. WATERMEIER
BY John R. Walker III
Attorney

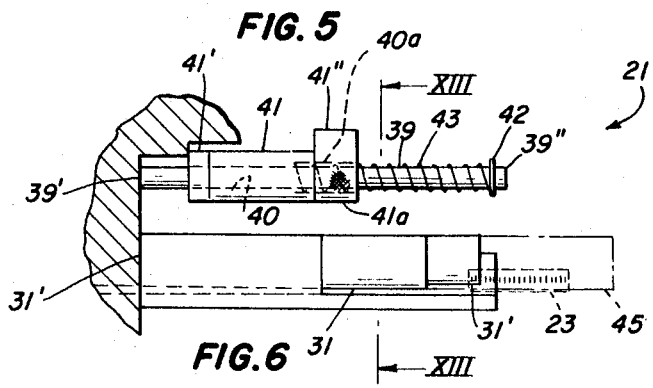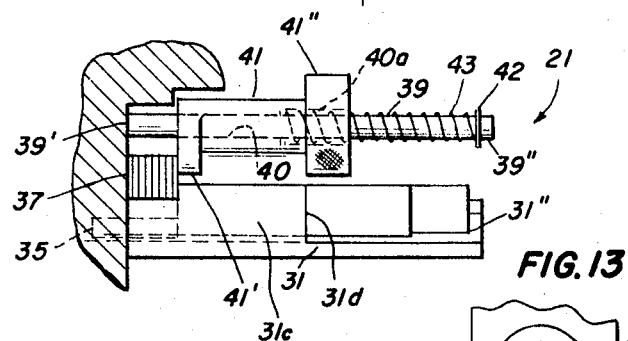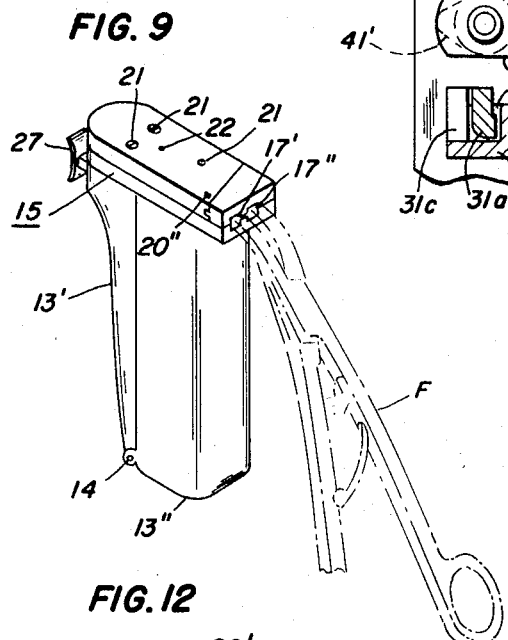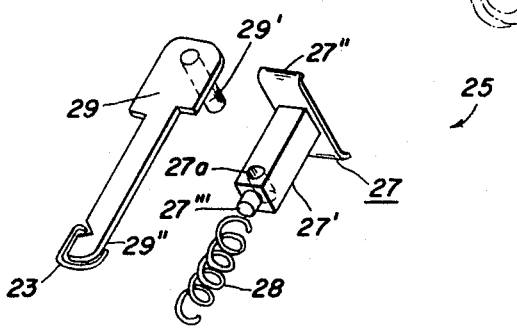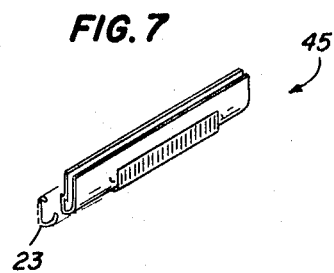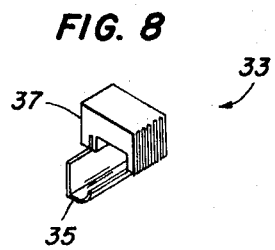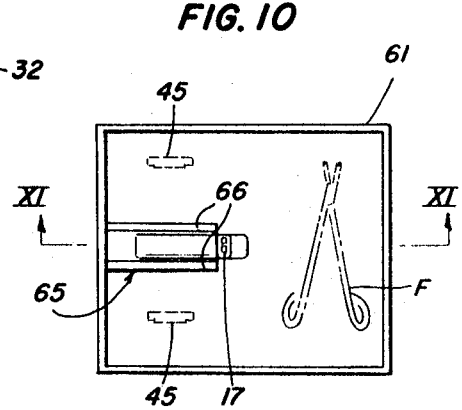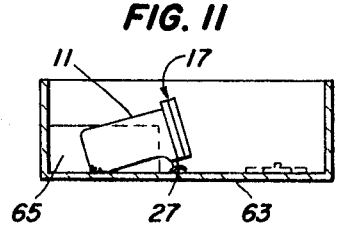

PORTABLE LOADING MECHANISM FOR HEMOSTASIS CLIPS

BACKGROUND OF THE INVENTION

1. Field of the Invention

This invention relates to portable loading mechanisms for hemostasis clips.

2. Description of the Prior Art

The most widely used technique for the closure of blood vessels or hemostasis has been by means of needle and suture. There have been various attempts to reduce the time spent in this phase of surgery by the use of various metal clips and the like. One type of clip, which the present invention is particularly adapted to load, is a hemostasis clip known as the "Surgiclip" of the type shown in McDermott U.S. Pat. No. 3,463,156. A loading mechanism known as the "McDermott Surgiclip System" or loader was heretofore developed, but failed in marketing primarily due to the complexity of the loader and the difficulty and number of steps of loading the clips in the loader, and getting the clips from the loader to the forceps. This McDermott loader was a table model which had a vertically arranged plunger connected through levers to a pushrod to move the "Surgiclips" from the end of a magazine to a pair of narrow mouth portions of slightly larger size than the size of the forceps and which was difficult for the forceps to be inserted therein. There were approximately 26 different steps for loading and getting the clips from the loader to the forceps.

SUMMARY OF THE INVENTION

The present invention is directed towards overcoming the heretofore-mentioned and other disadvantages in prior loading mechanisms for hemostasis clips.

It is a primary concept of the present invention to provide a portable loading mechanism for hemostasis clips which is adapted to be held in one hand by the nurse of the surgeon or other personnel for loading a hemostasis clip into the applicator forceps which are held in the other hand. This loading is accomplished by pushing inwardly with the thumb of the hand holding the loading mechanism while the end of the forceps are received in the mouth of the loading mechanism. It is a feature of the present invention to form the mouth in the shape of a pair of bell-mouth receptacles so that the ends of the applicator forceps can easily and quickly be guided into place in the mouth, as opposed to the difficulty in placing the ends of the forceps into the narrow openings in the prior table-supported type.

It is further objective of the present invention to provide means wherein the structure adjacent the mouth of the loading mechanism can be easily swung open from a normally closed position to allow cleaning of blood and the like of jammed clips from the mechanism. This swingable portion is quickly and easily opened by a flip of the thumb and without having to unlatch or unscrew various complicated mechanism in order to expose the interior of the mouth. Thus, the movable portion is normally held in a closed position by detent means which is easily unlatchable by slight pressure from the thumb.

In addition, the present invention has an improved magazine construction in which there is a first clip-engaging follower and a second follower turnably and slidably mounted on a rod. The second follower has a foot portion and a knob portion that is flattened on one side to permit passage of the first follower when it is desired to load or unload the magazine and which is turnable into an engaged position with the foot engaging behind the first follower with a compression spring encircling the rod to urge the second follower and the first follower towards the head of the device for delivery of clips to the head.

Also, the loading mechanism of the present invention is adapted to be used in combination with an autoclave box having a holder therein so that, if desired, the loading mechanism can be placed in the holder of the autoclave box before autoclaving and then, after autoclaving, the clips can be loaded without touching the loading mechanism by hand but rather by pushing downwardly into the mouth of the loading mechanism with the forceps to cause the plunger means to be actuated.

BRIEF DESCRIPTION OF THE DRAWING

FIG. 5 is a fragmentary view showing the magazine mechanism in a first position for loading.

FIG. 6 is a view similar to FIG. 5 showing the magazine in a normally loaded position.

FIG. 7 is a perspective view of a clip carrier.

FIG. 8 is a perspective view of the clip-engaging or first follower.

FIG. 9 is a perspective view of the loading mechanism and applicator forceps being shown in broken lines being loaded by the loading mechanism.

FIG. 10 is a plan view showing the loading mechanism in combination with an autoclave box and with forceps and clip cartridges being shown in broken lines.

FIG. 11 is a sectional view taken as on line XI–XI of FIG. 10.

FIG. 12 is a perspective exploded view of the plunger means.

FIG. 13 is a fragmentary sectional view taken on the line XIII–XIII of FIG. 5.

DESCRIPTION OF THE PREFERRED EMBODIMENT

Figure 1:
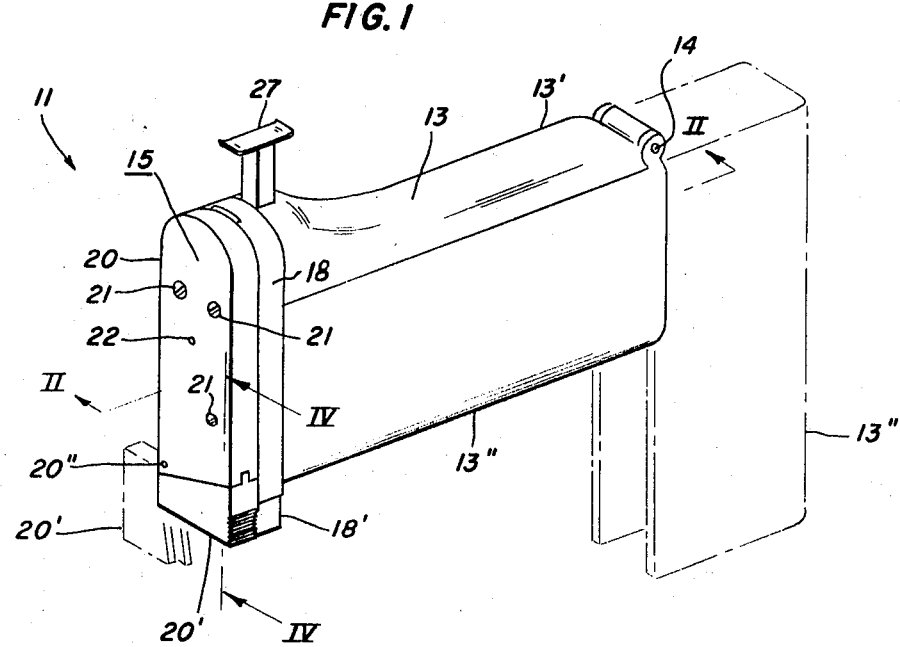
FIG. 1 is a perspective view of the loading mechanism of the present invention.
Figure 2:
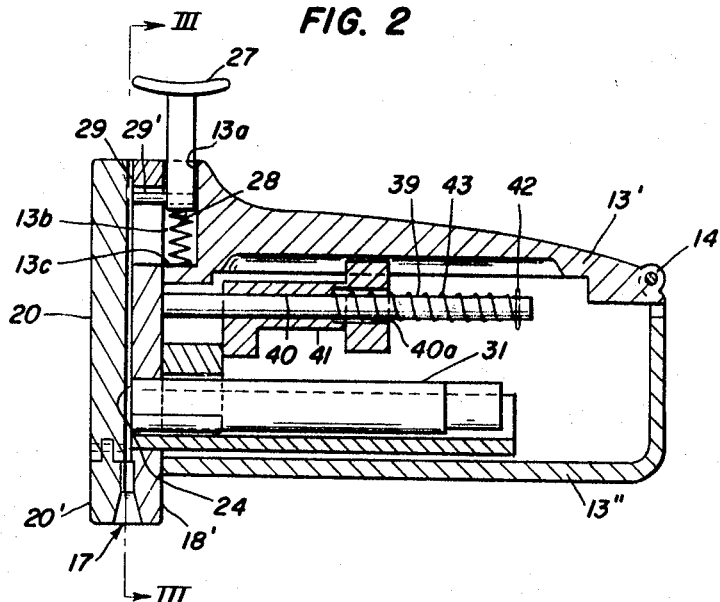
FIG. 2 is a sectional view taken as on the line II–II of FIG. 1.

The portable loading mechanism of the present invention indicated by numeral 11 is intended for use by nurses, doctors, or others to load applicator forceps with hemostasis clips to be used in tying off blood vessels during surgery. The loading mechanism includes a hollow base 13, designed to easily be held in the hand, having a fixed portion 13' and a movable portion 13 " hingedly attached to the fixed portion as by a pin 14, for movement between a closed position shown in solid lines in FIG. 1 and an open position shown in broken lines in this figure. Portion 13 " is substantially U-shaped in cross section and with portion 13' forms a closure for the parts, later to be described, in the interior of base 13. A clip-receiving head 15 mounted on base 13 is provided at one end thereof with a mouth 17 adapted to receive the open jaws of a pair of applicator forceps F, said mouth 17 having two bell-mouth-shaped sockets 17', 17" respectively. Head 15 is preferably formed by a pair of platelike portions, namely a lower plate 18 and an upper plate 20, which are fixedly held together and to base 13 by suitable means, as bolts 21 extending through apertures, not shown, in plates 18, 20 and threaded into threaded sockets, not shown, in base 13. Mouth portion 17 also includes a lower portion 18' which is a part of plate 18 and includes an upper portion 20' which is swingably mounted to head plate 20, as by a pin 20", for movement between a normally closed position in alignment with the lower portion 18' and an open position exposing the inner side of the lower portion 18'.

Figure 3:
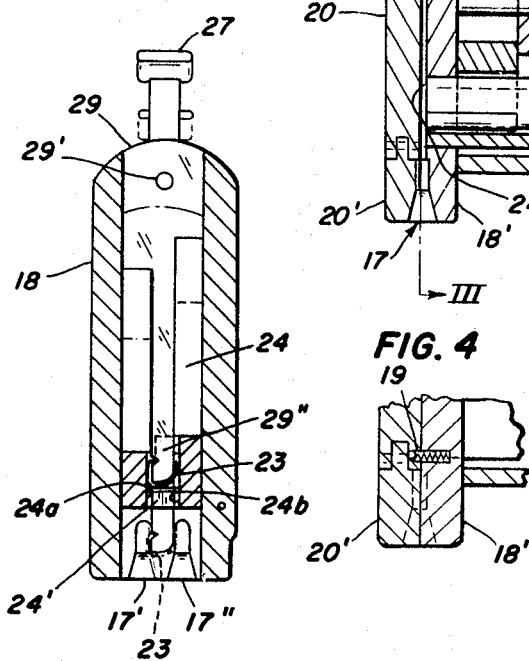
FIG. 3 is a sectional view taken as on the line III–III of FIG. 2.
Figure 4:
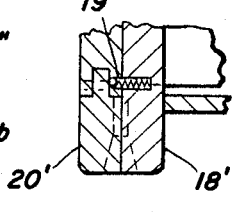
FIG. 4 is a fragmentary sectional view taken as on the line IV–IV of FIG. 1.

Upper portion 20' is fittingly joined to head plate 20 by a dovetail section forming an inclined plane, rising from a low point at the pivot side edge adjacent bell-mouth-shaped socket 17' to a high point at the edge adjacent bell-mouth-shaped socket 17", as viewed in FIGS. 1 and 3. Upper portion 20' has a portion of the edge adjacent bell-mouth-shaped socket 17" knurled (or a plurality of parallel grooves machined thereon) to facilitate easy movement of same by one's thumb or finger to the open position from the normally closed position and from the open position to the normally closed position. A ballsocket detent 19, best viewed in FIG. 4, is employed for retaining upper portion 20' in the normally closed position and allowing easy opening for cleaning and the like. The interior of the base 13 houses a magazine mechanism 22 yet to be described, which delivers the clips 23 one at a time to a preloading position in the clip-receiving head 15. It should be noted that one of the clips 23 is shown in solid lines in a preloading position in FIG. 3.

The clip-receiving head 15 has a channel 24 machined therein at the juncture of plates 18, 20 and running longitudinal from the mouth 17 end to the opposite end. Channel 24 is slightly greater in depth and width than the largest dimensions (thickness and width respectively) of a slide portion 29 allowing slide portion 29 to be slidably mounted within said channel 24 for movement towards and away from mouth 17. There is secondary channel or depression 24' within channel 24 having spaced apart side edges 24a and 24b which guide the side edges of the clips 23 as they are moved from said preloading position to a loading position shown in broken lines in FIG. 3 by the slide portion 29, as will be better understood in the description to follow hereinafter. It should be noted that slide portion 29 is reduced in width along a major portion thereof at the end and terminated in an end 29" which is shaped to fit the inside configuration of a clip 23 which it engages in moving same from said preloading position to said loading position.

Plunger means 25, as viewed in FIG. 12, includes a pushrod 27, directly connected slide portion 29 and a plunger spring 28. Pushrod 27 includes a square shaft portion 27' protruding perpendicularly from a finger or thumb-engaging end portion 27" of the pushrod 27. Shaft portion 27'" slidably extends through an aperture 13a in base fixed portion 13' and into a slightly larger square slit 13b allowing free travel back and forth. The innermost end of pushrod portion 27 is machine turned to a right cylindrical shape as at 27'" and is drilled transversely through square shaft portion 27' adjacent cylindrical shaped end as at 27a to receive a pin 29'. One end of the compression spring 28 encircles the cylindrical shaped end 27'" of pushrod 27 and the other end of compression spring 28 rests against the bottom 13c of square slot 13 in base fixed portion 13'. Pin 29' is fixedly attached in a position perpendicular to the plane of slide portion 29 for engagement in a hole 27a in pushrod 27 so that pushrod 27 and slide 29 move fore and aft in unity. When in the resting or outward position, the protruding fingerlike end 29" of slide portion 29, which is shaped like the interior of clip 23, is resting precisely over the proximal end 31' of a slide 31. Pushrod 27 is urged outwardly from base 13 by compression spring 28 and slide portion 29, which is directly connected therewith, slides portion 29, which is directly connected therewith, slides in channel 24 to said resting or outward position. Pressure applied to finger or thumb-engaging pushrod 27 carries clip 23 into a loading position shown in broken lines in FIG. 3 to be gripped by the open jaws of forceps F. Slide portion 29 being machined to approximately the same thickness as the clip 23 stock width enables the slide portion protruding fingerlike end 29" to freely move clip 23 from the preloading position to the loading position in and along secondary channel 24', thus minimizing the likelihood of slide portion 29 jamming clip 23 within channel 24'. Head plate 20 has an aperture 22 provided to dissipate heat created by autoclave process and to insert sterilized oil, in the event lubrication is required.

Magazine mechanism 21 includes slide 31 for slidably receiving a plurality of clips 23 and having a proximal end 31' adjacent channel 24 fixedly attached to lower plate 18 in perpendicular relationship thereto, and a distal end 31" remote therefrom. Slide 31 includes an inner part 31a and an outer part 31b spaced outwardly from inner part 31a and defining a clip-receiving groove 32 extending into channel 24. Outer part 31b is substantially U-shaped along the length of the left end thereof as viewed in FIGS. 5 and 6, but the right end of the wall 31c of outer part 31b is cut away so that the clips are exposed whereby they may be pushed along slide 31, if necessary, during loading. In other words, wall 31c of outer part 31b extends from the proximal end 31' of slide 31 to the end surface 31d of wall 31c where it terminates. Distal end 31" of inner part 31a is machined slightly smaller to slidably receive clip cartridge 45, as shown installed in FIG. 5 and removed in FIG. 6, thusly providing a smooth and continuous surface to slip a plurality of clips 23 from clip cartridge 45 onto slide 31. After loading the clips 23, cartridge 45 is removed and discarded, and first follower 33 is slidably installed onto slide 31.

First follower 33, which includes a clip-engaging portion 35 shaped similar to the configuration of a clip 23 and a blocklike enlarged portion 37, is slidingly installed on slide 31 with clip-engaging portion 35 extending into groove 32 and making contact with the last clip 23 on slide 31, and with the enlarged portion extending outwardly in a direction toward a rod 39 which is disposed in parallel relationship to slide 31. Rod 39, having a length which approximates that of slide 31, is fixedly suspended in base 13 from plate 18 in parallel spaced relationship to slide 31 and has a proximal end 39' adjacent the proximal end 31' of slide 31 and a distal end 39" adjacent the distal end 31" of slide 31. A second follower 41 is slidably and turnably mounted on rod 39 through a hole 40 drilled longitudinally in second follower 41. The second follower 41 has a foot portion 41' extending outwardly in a direction away from rod 39 and also a knob portion 41" having a flattened side 41a to permit passage of enlarge portion 37 of first follower 33. It should be understood that knob portion 41" may be rotated so that said flattened side is adjacent enlarge portion 37 to permit passage of enlarge portion 37 of first follower 33 in removing and replacing first follower 33. The second follower foot portion 41' is turnable or rotatable by knob portion 41" between an engaged position in which foot portion 41' engages behind first follower enlarged portion 37 and a disengaged position in which foot portion 41' is disengaged from first follower enlarged portion 37 to allow removal of first follower 33.

A compression spring 43 encircles rod 39 and one end is attached at the distal end 39" of rod 39 by a true-arc ring 42 encircling rod distal end 39" and seated into a machined groove at distal end 39". The other end of compression spring 43 is received into enlarged portion 40a of hole 40 drilled longitudinally in second follower 41 which stabilizes spring 43 precluding the possibility of the spring 43 jamming between rod 39 and second follower 41. The compression spring 43 urges second follower 41 and first follower 33 (when the two are in an engaged position) toward the proximal end 31' of slide 31, thusly maintaining pressure on clips 23, successively delivering one clip at a time to said preload position within said clip-receiving head 15.

An autoclave box 61 is provided to hold, while sterilizing, the portable loading mechanism 11, forceps F and necessary clip cartridges 45 and is constructed in a manner which enables one person such as a doctor working alone to utilize the portable loading mechanism 11 to load applicator forceps F using just one hand. The autoclave box 61 includes a bottom 63 upon which is mounted a holder 65 formed by a pair of vertically disposed parallel platelike members 66 designed to hold portable loading mechanism 11, in a removably mounted manner, with pushrod portion 27 engaging bottom 63 of autoclave box 61 and with mouth 17 facing upwardly. An individual, such as a doctor having a pair of applicator forceps F in one hand and after placing open jaws of forceps F into mouth 17 of portable loading mechanism 11, may apply downward pressure on forceps F causing pushrod 27 to move inwardly which action drives clip 23 from the preloading position into the loading position in mouth 17 for grasping by applicator forceps F to be used in tying off blood vessels during surgery.

Although the invention has been described and illustrated with respect to a preferred embodiment thereof, it is to be understood that it is not to be so limited since changes and modifications may be made therein which are within the full intended scope of this invention.

I claim:

1. A portable loading mechanism for hemostasis clips comprising a base adapted to be held in the hand, a clip-receiving head mounted on said base and provided with a mouth adapted to receive the ends of a pair of forceps, magazine means in said base for successively delivering one clip at a time to preloading position adjacent the end of said magazine means, plunger means including a pushrod portion extending remotely from said mouth for moving inwardly from a normal outward position to push a clip from the preloading position into a loading position in said mouth; said magazine means including a slide adapted for slidably receiving a plurality of clips thereon, said slide including a proximal end adjacent said head and a distal end remote therefrom, said slide including slide surfaces defining a clip-receiving groove extending into said head, a first follower including a clip-engaging portion slidable in said groove and an enlarged portion extending outwardly of said slide, a rod mounted in said base and in parallel spaced relationship to said slide, and including a proximal end adjacent the proximal end of said slide and a distal end adjacent the distal end of said slide, a second follower slidable and turnably mounted on said rod; said second follower including a foot portion extending outwardly in a direction away from said rod, and including a knob portion having a flat side to permit passage of said enlarged portion of said second follower when said knob portion is turned so that flattened side is adjacent said enlarged portion, said second follower being turnable by said knob portion between an engaged position in which said foot portion engages behind said first follower and disengaged position in which said foot portion is disengaged from said first follower to allow removal of said first follower; and a compression spring means encircling said rod, attached at one end to said rod adjacent the distal end of said rod and seated against said second follower at the other end to urge said second follower and said first follower therewith when in an engaged position towards the proximal end of said slide.

2. A portable loading mechanism for hemostasis clips comprising a handgrip base adapted to be held in the hand, a clip-receiving head mounted on said base and provided with a channel therein, said head having a main body portion and having structure adjacent one end portion of said main body portion defining a mouth including a pair of side-by-side bellmouth-shaped sockets communicated with said channel and adapted to receive the ends of forceps, magazine means in said base for delivering one clip at a time into said channel at a place in spaced relationship to said pair of sockets; said structure defining said mouth comprising a stationary lower portion defining the lower portion of said mouth and an upper portion defining the upper portion of said mouth, means swingably mounting said upper portion relative to said lower portion and said main body for movement between a normally closed position in alignment with said lower portion and an open position exposing said lower portion, detent means removably retaining said upper portion in said normally closed position and allowing easy opening thereof for cleaning and the like; plunger means including a slide portion slidably mounted in said channel and a finger-engaging pushrod portion directly connected to said slide portion and extending outwardly form said base and said slide portion for engagement of the clip delivered to said channel and for pushing the clip into said mouth upon pressure being applied to said finger-engaging portion to carry the clip into a position to be gripped by forceps.

3. The portable loading mechanism of claim 2 in which said magazine means includes a slide adapted for slidably receiving a plurality of clips thereon, said slide including a proximal end adjacent said channel and a distal end remote therefrom, said slide including slide surfaces defining a clip-receiving groove extending into said channel, a first follower including a clip-engaging portion slidable in said groove and an enlarged portion extending outwardly of said slide, a rod mounted in said base in parallel spaced relationship to said slide and including a proximal end adjacent the proximal end of said slide and a distal end adjacent the distal end of said slide, a second follower slidably and turnably mounted on said rod; said second follower including a foot portion extending outwardly in a direction away from said rod, and including a knob portion having a flattened side to permit passage of said enlarged portion of said first follower when said knob portion is turned so that said flattened side is adjacent said enlarged portion, said second follower being turnable by said knob portion between and engaged position in which said foot portion engages behind said first follower and disengaged positions in which said foot portion is disengaged from said first follower to allow removal of said first follower, a compression spring means encircling said rod, attached at one end of said rod adjacent the distal end of said rod, and seated against said second follower at the other end to urge said second follower and said first follower therewith when in an engaged position towards the proximal end of said slide.

4. The portable loading mechanism of claim 3 in which said base includes a relatively fixed portion attached to said head and a movable portion hingedly attached to said fixed portion for movement between a normally closed position and an open position to expose said magazine means for the loading of clips thereon.